United States Patent [19]

Morita et al.

[11] 4,147,371

[45] Apr. 3, 1979

[54] TELESCOPIC FRONT FORK CONSTRUCTION FOR MOTORCYCLE

[75] Inventors: Isamu Morita, Asaka; Hidehiko Inoue, Oai; Yasuo Ohashi, Fujimi, all of Japan

[73] Assignee: Honda Giken Kogyo Kabushiki Kaisha, Tokyo, Japan

[21] Appl. No.: 792,204

[22] Filed: Apr. 29, 1977

[30] Foreign Application Priority Data

May 14, 1976 [JP] Japan .................. 51-60738

[51] Int. Cl.$^2$ ............................................ B62K 25/08
[52] U.S. Cl. ..................... 280/276; 180/32; 188/322
[58] Field of Search ................. 280/276, 277, 279; 180/32; 188/322

[56] References Cited

U.S. PATENT DOCUMENTS 4,039,200  8/1977  McGonegle ........................ 180/32

FOREIGN PATENT DOCUMENTS 497342 12/1950 Belgium ..................................... 180/32
586372  3/1947 United Kingdom ..................... 280/276

Primary Examiner—Joseph F. Peters, Jr.
Assistant Examiner—Donn McGiehan
Attorney, Agent, or Firm—Lyon & Lyon

[57] ABSTRACT

A motorcycle or the like is provided with parallel telescoping tubes forming part of an inclined front fork assembly straddling the front wheel. The wheel is mounted for rotation on said assembly about an axis spaced rearward of the telescoping tubes to reduce friction forces between them. The lower ends of the upper tubes are tapered to promote the formation of oil wedges for maintaining an oil film between the telescoping parts. Also, the fork assembly is mounted on the frame for pivotal movement about an inclined axis diverging with respect to a plane containing the axes of the telescoping tubes.

4 Claims, 14 Drawing Figures

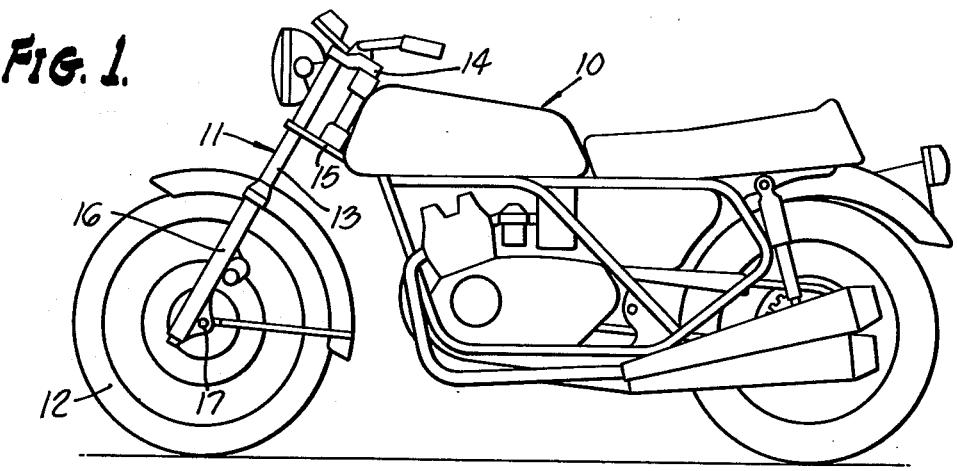
FIG. 1.
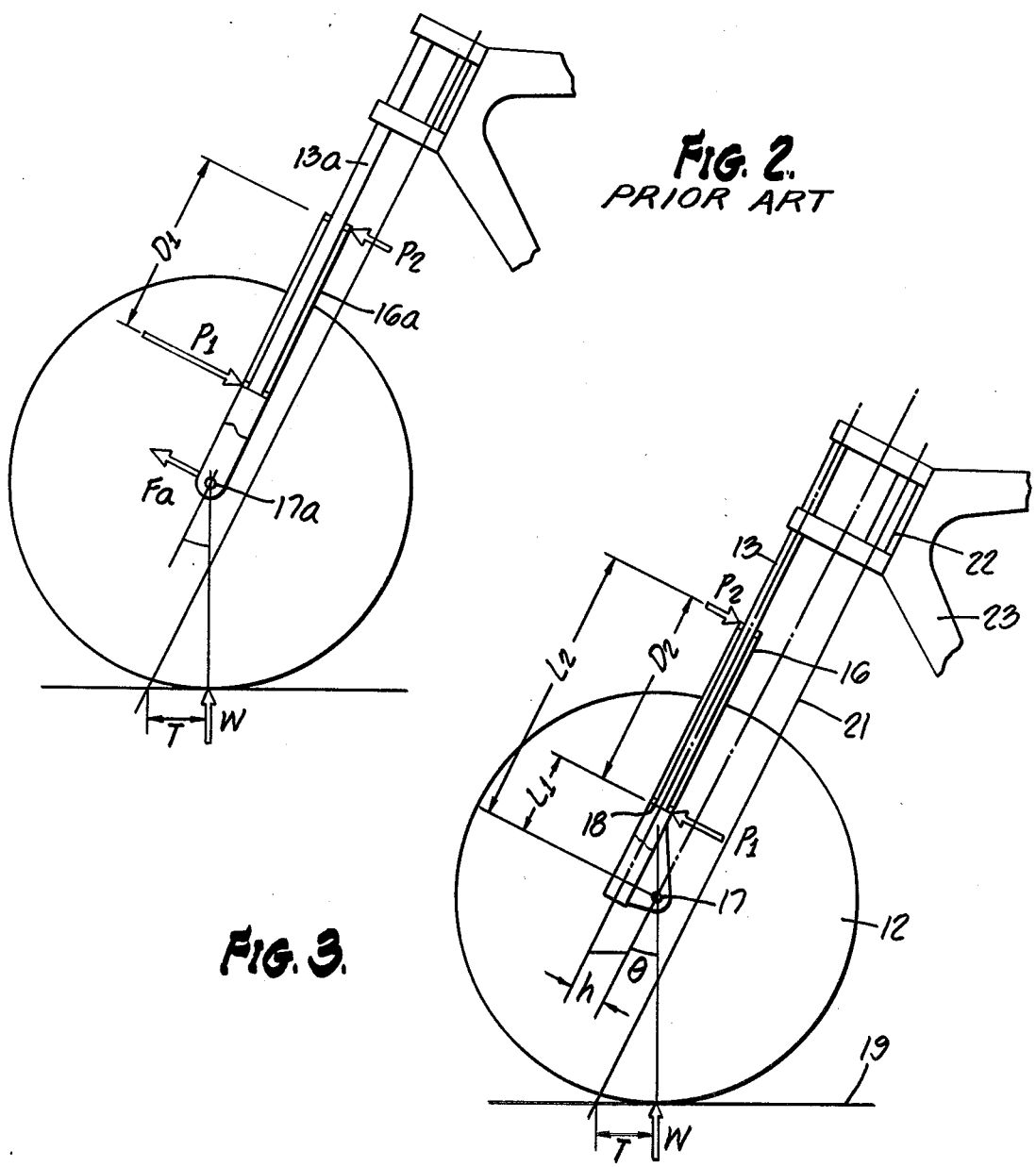
FIG. 2. PRIOR ART
FIG. 3.

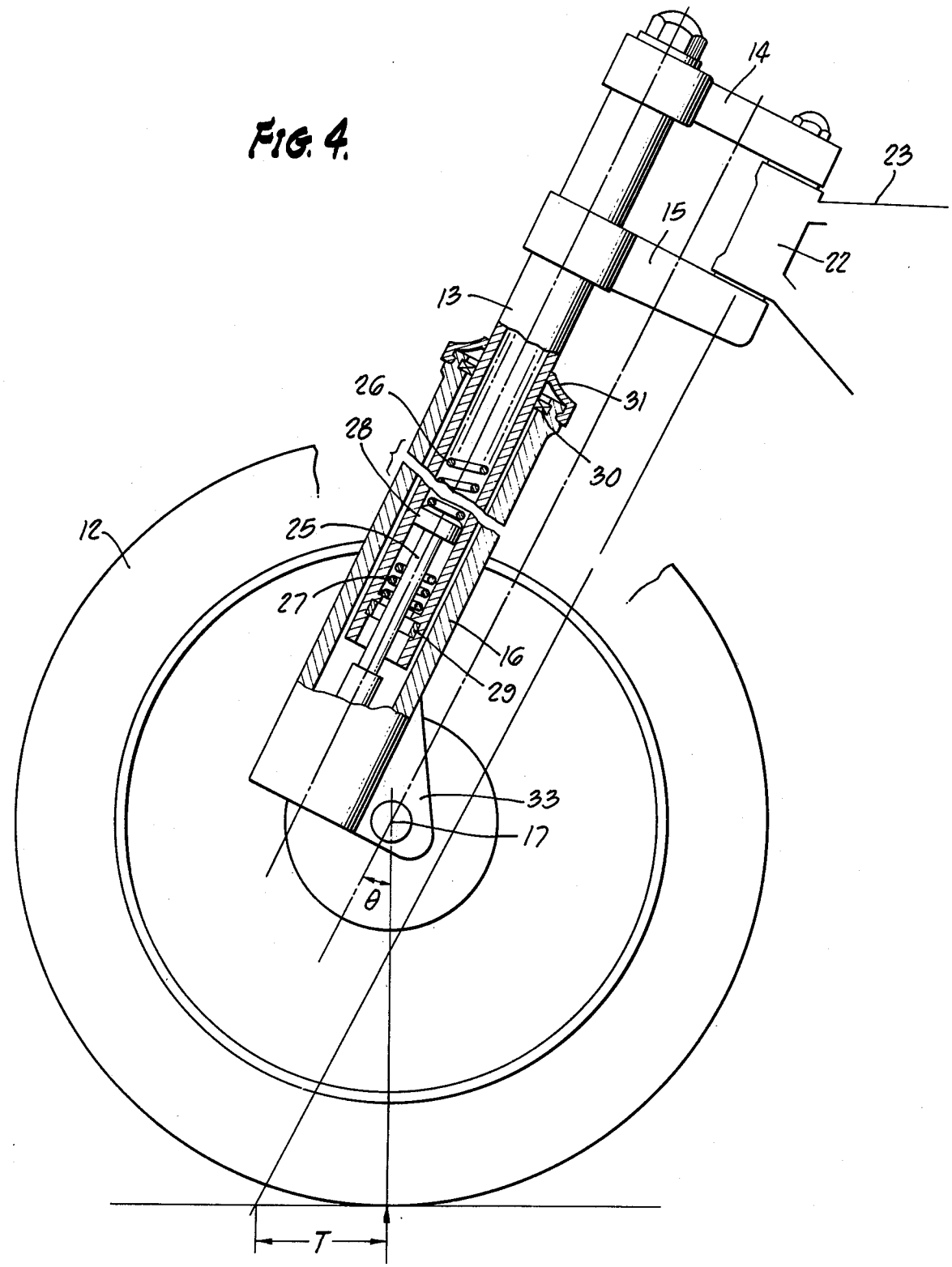

TELESCOPIC FRONT FORK CONSTRUCTION FOR MOTORCYCLE

This invention relates to vehicles such as motorcycles or the like and is particularly directed to improvements in a front fork assembly having telescoping parts which straddle the front wheel. The axle of the front wheel is carried on the fork assembly at a location to the rear of the telescoping tubes, in order to reduce the side forces acting on the tubes by reason of the inclination of the front fork assembly. This improves shock absorber performance and riding comfort without impairing the running stability and handling stability. The amount of offset of the axis of the front wheel is determined by placing it on a vertical line extending from a wheel-contacting horizontal surface to the lower active portion of each of the upper telescoping tubes, when the motorcycle is in static condition.

In another aspect of the invention, the lower active ends of the upper telescoping tubes, or fork pipes, are tapered to a very small degree or shaped in an extremely large arc in order to cause buildup of oil wedges and thereby maintain a film of oil between the telescoping parts.

In another aspect of the invention, the steering of the motorcycle or the like through handlebars is improved by reducing the moment of inertia of the front wheel assembly about the turning axis. This is accomplished by pivoting the front wheel assembly to the frame of the motorcycle for turning movement about an axis which is not parallel to the plane containing the axes of the telescoping tubes, but which diverges from that plane in a direction toward the ground support surface.

Other and more detailed objects and advantages will appear hereinafter.

In the drawings:

FIG. 1 is a side elevation of a motorcycle having a front fork assembly embodying this invention.

FIG. 2 is a diagram showing application of forces to a front fork assembly of a conventional type front fork assembly.

FIG. 3 is a diagram showing application of forces to a front fork assembly embodying this invention.

FIG. 4 is a side elevation partly broken away and partly in section, showing a structural form of the invention of FIG. 3.

Figure 6:
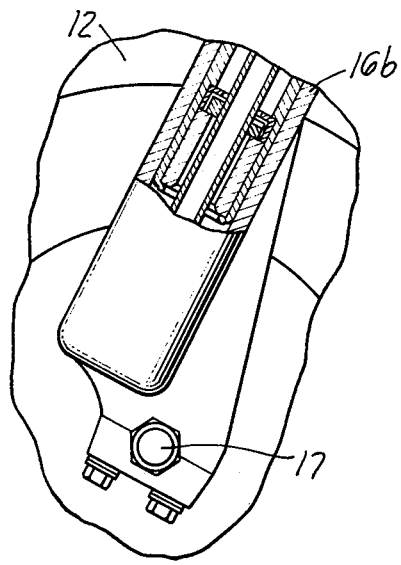
FIG. 6 is a fragmentary sectional view showing a modification.

Referring to the drawings, the motorcycle shown in FIG. 1 and generally designated 10 is provided with a telescopic front fork assembly 11 which straddles the front wheel 12. Parallel fork pipes 13 are fixed together by bridges 14 and 15. Each of the fork pipes or tubes 13 is telescopically received within a bottom tube 16, and the front wheel 12 is carried on these bottom tubes 16. The construction so far described is conventional.

In accordance with an important feature of this invention, the axis 17 of the wheel 12 is located to the rear of an inclined plane containing the axes of the tubes 13 and 16 which straddle the front wheel. The purpose of this rearward offset of the axis of the front wheel 12 is explained by consideration of the force diagrams of FIGS. 2 and 3. The conventional construction in FIG. 2 wherein wheel axis 17a intersects the axes of the inclined telescoping tubes 13a and 16a produces heavy side loads $P_1$ and $P_2$ which have the undesirable effect of increasing the friction between the telescopic tubes 13a and 16a.

As shown in FIG. 2, the line of action of the load W on the wheel 12, and the plane containing the axes of the telescoping tubes 13a and 16a, intersect at the lower ends of the tubes 16a, and as a result the load W acts as a force in the direction of Fa through the axis 17a, a large sliding-surface side force $P_1$ develops at the lower end of each fork pipe 13a, and also a side force $P_2$ develops in the opposite direction at the upper end of the outer tube 16a. Undesirable friction forces are developed which adversely affect free sliding movement of the parts 13a and 16a and interfere with proper action of hydraulic shock absorbers present in such devices (but omitted from FIG. 2 for clarity of illustration). These side loads $P_1$ and $P_2$ may be so great, particularly in the case of big motorcycles, that the strength and stiffness of the parts of the telescoping front fork assembly 11 must be taken into consideration in order to resist these forces.

A solution to the problem is shown by the diagram of FIG. 3, wherein the wheel axis 17 is spaced laterally to the rear of the plane containing the axes of the telescoping tubes 13 and 16. In this situation, the line of action of the load W passing through the wheel axis 17 also passes through the plane containing the axes of the telescoping tubes 13 and 16 at a location corresponding to the position of the lower ends 18 of the fork pipes or tubes 13, when the parts are in static condition.

Stated in other terms, this shift of the wheel axis 17 rearward of the axes of the telescoping tubes 13 and 16 materially reduces the objectionable side loads shown at $P_1$ and $P_2$ in FIG. 2. This is a very important feature of the present invention.

In order to lower the side force, the amount of overlap, that is, the distance between the upper and lower load bearing points, may be increased. This dimension is shown at $D_1$ in the diagram of FIG. 2 and at $D_2$ in the diagram of FIG. 3. In a particular instance, it was found that, when the amount of this overlap was increased by 68 mm, the side force was decreased by 39%. The same amount of increase in overlap of 68 mm with the front wheel offset to the rear, as described above, resulted in a lowering of the side force by as much as 62%. However, increases in overlap are ordinarily restricted to small amounts because of vehicle posture, ground clearance, etc.

The "trail" T remains the same in FIG. 3 as in FIG. 2. This represents the horizontal distance measured on the wheel supporting surface 19 between the vertical line passing through the wheel axis 17 and the intersection of the inclined steering axis 21 with the same surface 19. The head pipe 22 fixed on the frame 23 pivotally supports the telescopic fork assembly 11 for movement about the steering axis 21.

The form of the invention shown in FIG. 4 is similar to that shown in the diagram of FIG. 3, additional structure being illustrated in the drawing. A guide pipe 25 is provided in the lower part of each member 16 and extends upward into the open lower end of a fork pipe 13. Springs 26 and 27 are mounted within each fork pipe 13 and a valve 28 is positioned between the springs. Oil is sealed within the telescoping portions of the tubes 13 and 16, so that a hydraulic shock absorbing action is obtained upon relative telescoping movement of the tubes. An oil lock valve is shown at 29, an oil seal is shown at 30, and a dust seal is shown at 31.

As pointed out above, the fork pipes 13 are each fixed at their upper ends to an upper bridge 14 and a lower bridge 15, which are in turn mounted to turn as a unit on the head 22 of the frame 23. A bracket 33 is provided on the lower end of each outer tube 16 and these brackets carry the axle for the front wheel 12. The side loading on the telescoping parts is reduced to that sliding movement of the parts takes place with less friction, and shock absorbing action is improved.

Figure 5:
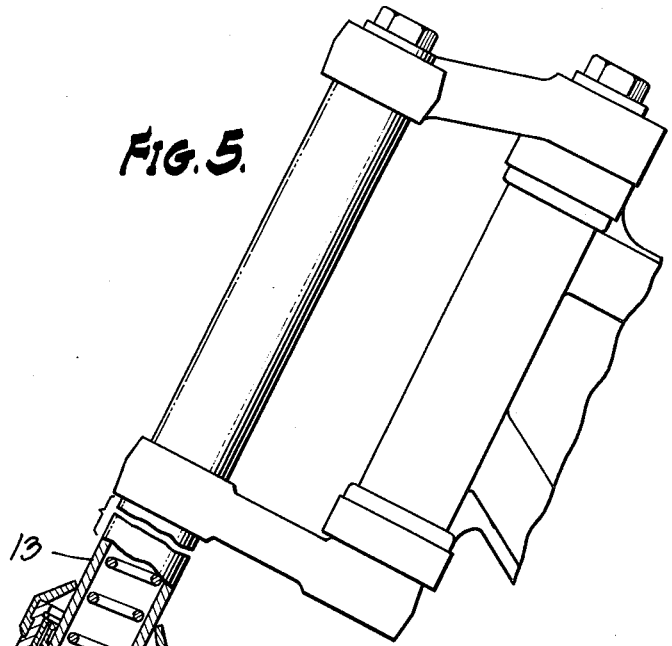
FIG. 5 is a side elevation partly broken away and partly in section, showing a preferred form of this invention.

The apparatus shown in FIG. 5 is similar to that shown in FIG. 4 except that the lower ends of the outer tubes 16 extend below the axis 17 of the front wheel 12. Like the other forms of this invention, the wheel axis 17 is spaced rearward of the plane containing the axes of the telescoping parts 13 and 16.

FIG. 6 shows a modification of the lower end of the outer tubes 16b. The axis 17 of the front wheel 12 is spaced below the lower ends of the outer tubes 16b, but it is also spaced to the rear of the plane containing the axes of the telescoping parts.

When the telescoping tubes of the front fork assembly do not move smoothly because of friction, a rough feeling is felt by hand when driving a motorcycle over an irregular road surface. Offsetting the front wheel axis to the rear of the plane containing the axes of the telescoping parts reduces the side forces, as explained above, and has a very large effect in the improvement of riding comfort.

The following relationships are known:

$$h \cdot W \cos \theta = -P_1 L_1 + P_2 L_2 \quad (1)$$

$$W \sin \theta = P_1 - P_2 \quad (2)$$

From the above equations (1) and (2), the amount of offset "h" and amount of overlap ($L_2 - L_1$) are determined so that $|P_1| + |P_2|$ becomes minimum. In this case, in order to make $|P_1| + |P_2|$ minimum, set $P_2 = 0$, then, $P_1 = W \sin \theta$; therefore the side force becomes minimum.

Figure 7:
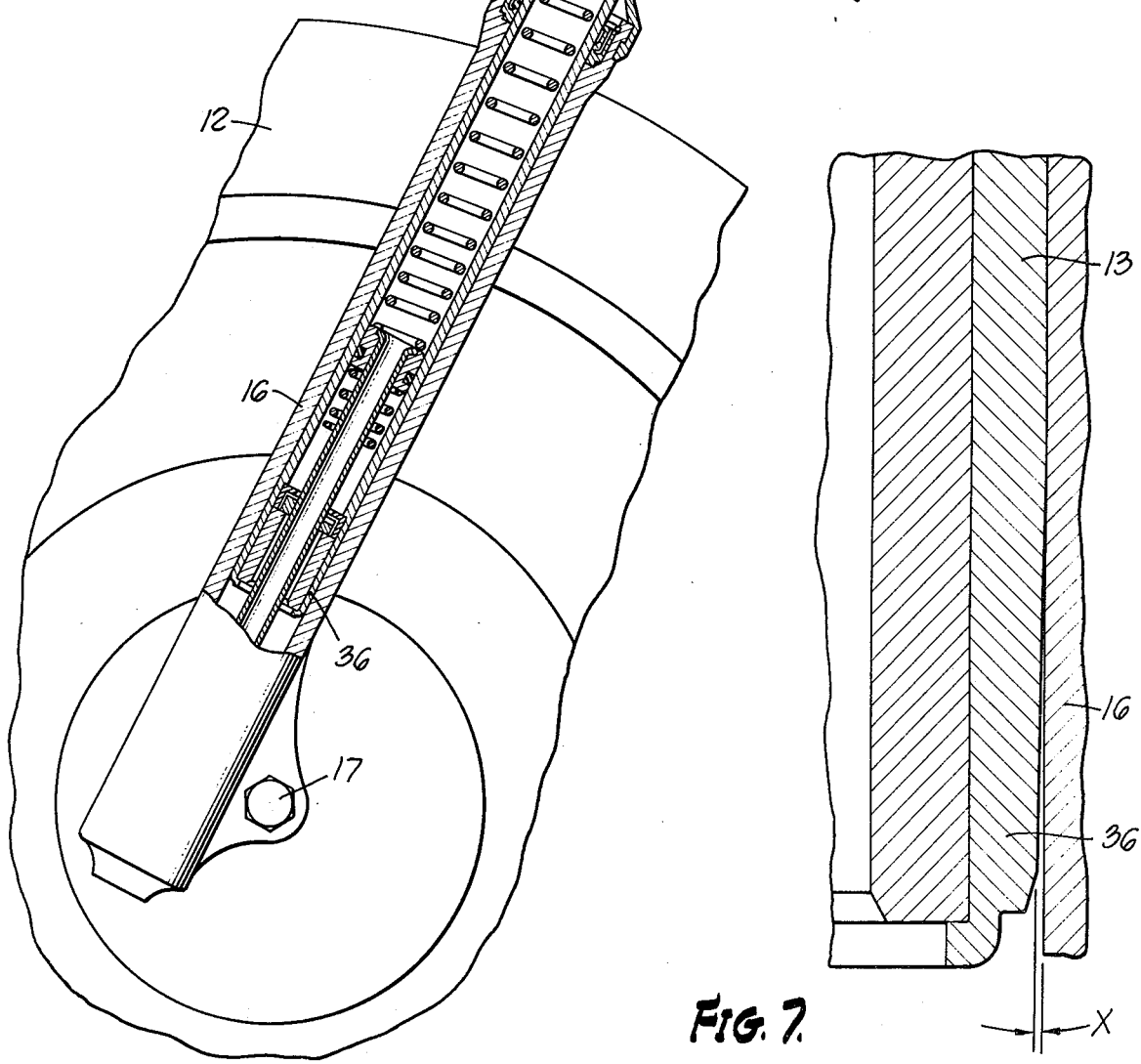
FIG. 7 is a sectional detail showing a portion of FIG. 5 on an enlarged scale.
Figure 11:
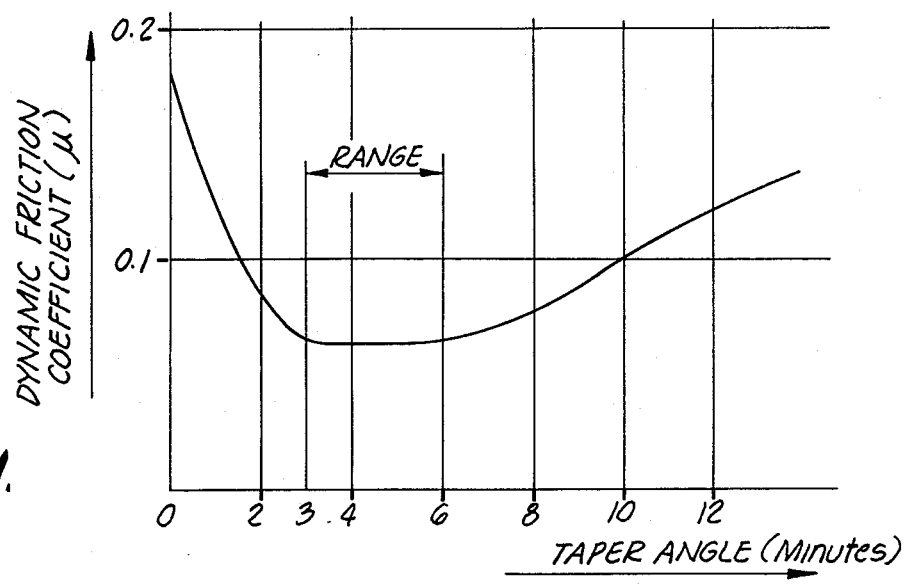
FIG. 11 is a graph showing the relationship between the dynamic friction coefficient and the angle of taper of the sliding part with respect to the tube which it contacts.

It is important that the tip ends 36 of the fork pipes 13 have a tapered shape which favors the development of an oil wedge between each fork tip 36 and the encircling outer tube 16. The taper angle x shown in FIG. 7 is exaggerated for purposes of clarity of illustration. As shown in FIG. 11, the taper angle on each fork tip 36 should be much smaller than 1° and best results are achieved when the angle x lies between 3 minutes and 6 Minutes. The lower end of each fork pipe may also be shaped in a large arc to create an oil wedge between telescoping parts. With this very small taper, an oil wedge is developed which serves to maintain an oil film between the telescoping parts and thus reduces sliding friction. This in turn reduces road shock through the handlebars to the hands of the rider of the motorcycle.

Figure 8:
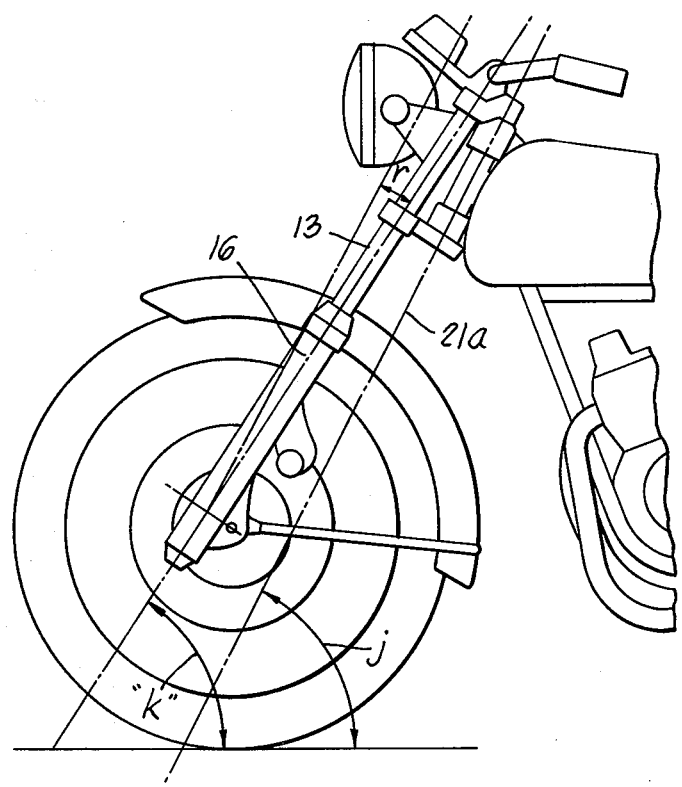
FIG. 8 is a side elevation partly broken away, showing another modification.
Figure 7A:
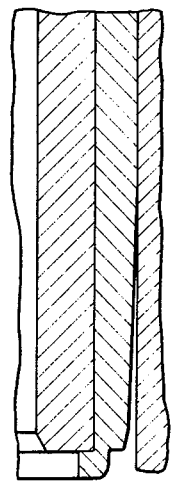
FIG. 7a is a fragmentary enlarged detail view similar to FIG. 7, showing a modification.
Figure 9:
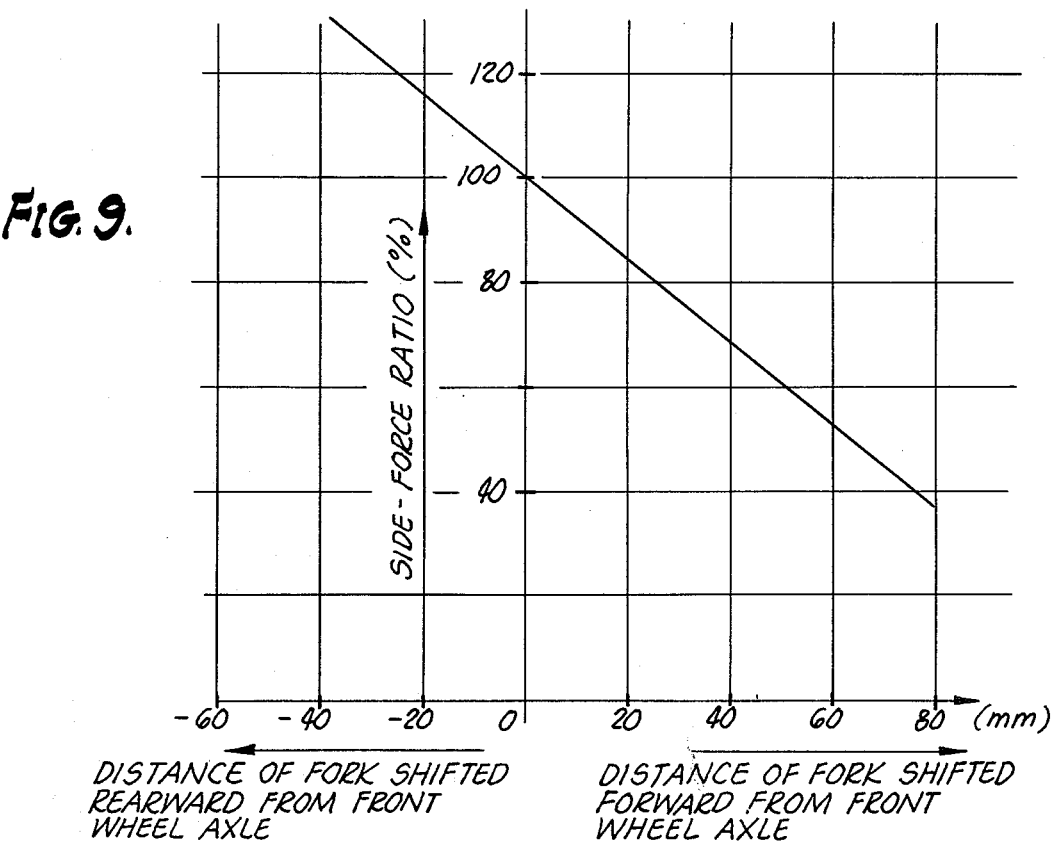
FIG. 9 is a graph showing the relationship of the side force ratio to the offset distance of the fork axis with respect to the front wheel axle.
Figure 10:
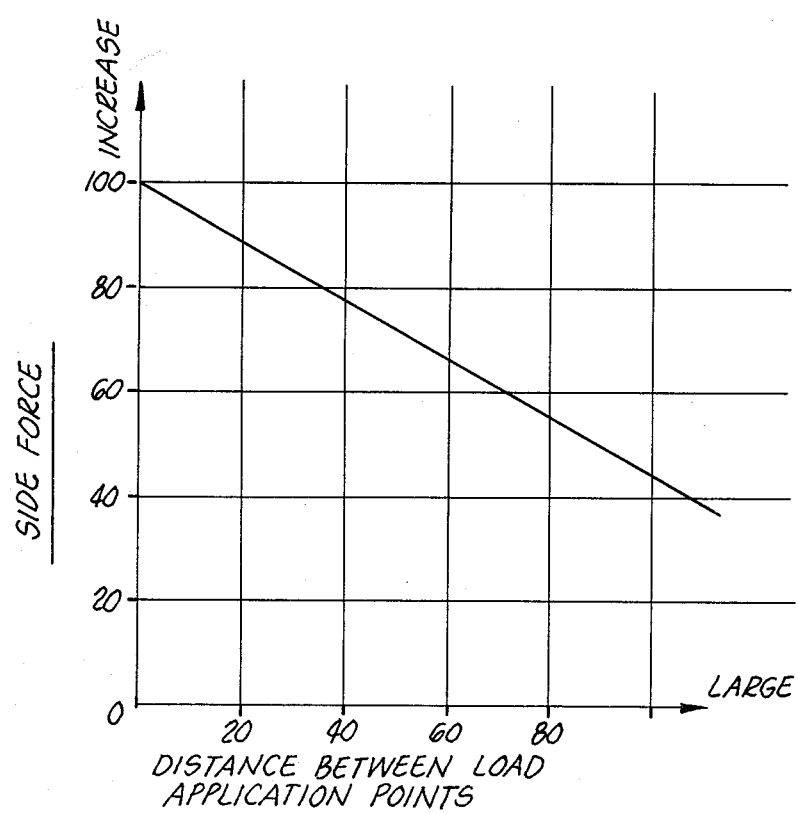
FIG. 10 is a graph showing the relationship of the side force to the distance between the load application points.

In accordance with another aspect of this invention, the turning effort required to be exerted on the handlebars by the rider of the motorcycle is reduced by tilting the steering axis with respect to the plane defined by the axes of the telescoping tubes. This tilting reduces the caster angle with the result that the said plane and the steering axis diverge in a downward direction. This concentration is shown in FIG. 8 wherein the steering axis 21a diverges downward with respect to the plane defined by the axes of the telescoping parts 13 and 16. The angle "j" is the caster angle and the angle "k" is the angle between the ground support surface and the axes of the telescoping tubes. The angle "j" is thus greater than the angle "k".

Neglecting friction, the torque required to turn the telescoping fork assembly 11, front wheel 12, and associated parts around the steering axis 21 is given by the following formula:

$$\Sigma M = W/g \cdot r2 \cdot d\omega/dt$$

where:
$\omega$: angular velocity
r: rotating radius
W: weight about the axis of steering As can clearly be seen from FIG. 8, it is possible to minimize said "r" by making "k" smaller.

To minimize the torque required to turn the parts around the steering axis 21a, the rotating radius r must be made small. The construction shown in FIG. 8 does this.

In accordance with another aspect of this invention, damping force is provided to eliminate undulating movement when the motorcycle is operating at low speed. Because of the caster angle, side forces on the telescoping assembly develop and the resulting friction has a larger effect on the operating characteristics when the motorcycle is driven in the low speed range. To balance the friction forces which have larger effect with the damping force produced by oil, the quantity of damping force required during the low speed range may be small.

Figure 12:
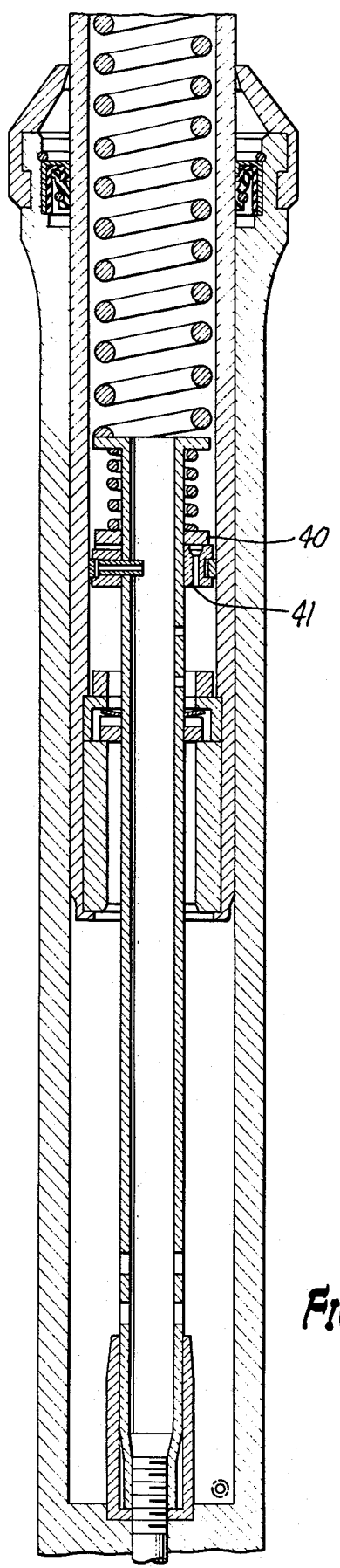
FIG. 12 is a sectional side elevation of another modification.
Figure 13:
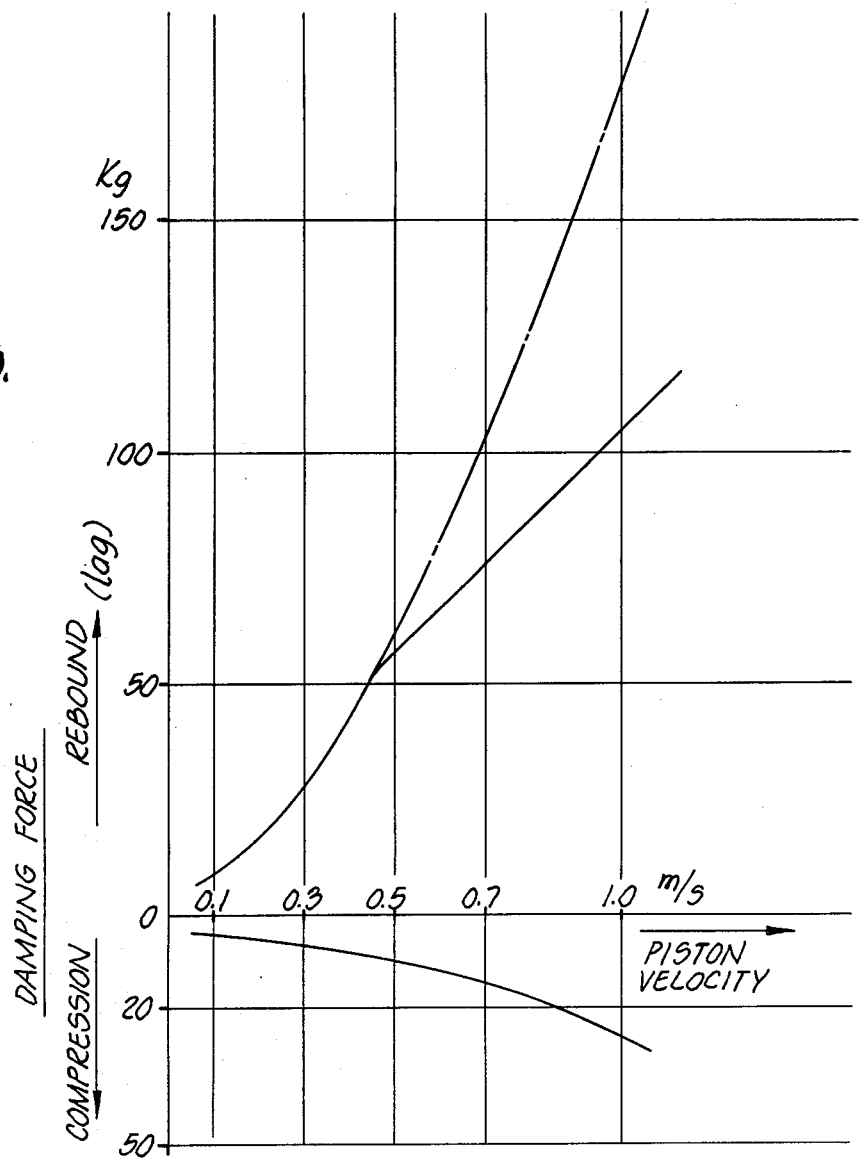
FIG. 13 is a graph showing the relationship between the damping force and the piston velocity.

However, the square term characteristics of the formulas involved show that damping force on the pull side becomes excessively large in the high speed range, causing the return speed of the front wheel to be slower and therefore the tire-ground contact characteristic to be poorer. To remedy such condition, and as shown in FIG. 12, a slide valve 40 and piston 41 are provided to lower the damping characteristic in high speed movement of the piston 41, and this results in the return speed of the front wheel to increase and the tire-ground contact characteristic to be improved. This system minimizes the undulating movement and is very effective in maintaining good handling stability. The curves of the graph of FIG. 13 show the desired characteristics.

having fully described our invention, it is to be understood that we are not to be limited to the details herein set forth but that our invention is of the full scope of the appended claims.

We claim:

1. In a motorcycle or the like, the combination of: a frame, a front wheel, a front fork assembly pivoted to the frame and straddling the front wheel, said assembly including inclined parallel fork pipes telescopically received in bottom tubes having parallel bores adapted to receive oil for lubrication, the axes of said fork pipes and said bottom tubes bores being inclined downward in a forward direction and defining an inclined plane, said inclined plane forming an angle with respect to a horizontal surface on which the front wheel rests, means for mounting said wheel on said bottom tubes for rotation about an axis spaced rearward of said inclined plane, the lower end of each fork pipe being tapered to a small angle between 3 minutes and 6 minutes to create an oil wedge between said telescoping parts.

2. In a motorcycle or the like, the combination of: a frame, a front wheel, a front fork assembly of the hydraulic shock absorption type pivoted to the frame and straddling the front wheel, said assembly including inclined parallel fork pipes each telescopically received in bottom tubes having parallel bores adapted to received oil for lubrication, the axes of said fork pipes and said bottom tube bores being inclined downward in a forward direction and defining an inclined plane, said inclined plane forming an angle with respect to a horizontal surface on which the front wheel rests, the lower end of each fork pipe being tapered to a small angle between 3 minutes and 6 minutes to create an oil wedge between said telescoping parts.

3. The apparatus set forth in claim 2 wherein means are provided for mounting said wheel on said bottom tubes for rotation about an axis spaced rearward of said inclined plane.

4. In a motorcycle or the like, the combination of: a frame, a front wheel, a front fork assembly of the hydraulic shock absorption type pivoted to the frame and straddling the front wheel, said assembly including inclined parallel fork pipes each telescopically received in bottom tubes having parallel bores adpated to receive oil for lubrication, the axes of said fork pipes and said bottom tube bores being inclined downward in a forward direction and defining an inclined plane, said inclined plane forming an angle with respect to a horizontal surface on which the front wheel rests, means for mounting said wheel on said bottom tubes for rotation about an axis spaced rearward of said inclined plane, the lower end of each fork pipe being shaped in a large arc to create an oil wedge between the telescoping parts.

* * * * *

UNITED STATES PATENT AND TRADEMARK OFFICE
CERTIFICATE OF CORRECTION

PATENT NO. : 4,147,371
DATED : April 3, 1979
INVENTOR(S) : ISAMU MORITA et al

It is certified that error appears in the above-identified patent and that said Letters Patent are hereby corrected as shown below:

First page, line [30]. Priority number should be changed from "51-60738" to read --51-60788--

Column 4, line 2, "Minutes" should read --minutes--

Column 4, line 34, there should be a period after "steering"

Column 4, line 67, "having" should read --Having--

Claim 1, line 10, "tubes" should read --tube--

Signed and Sealed this

Fourteenth Day of August 1979

[SEAL]

Attest:

LUTRELLE F. PARKER
*Attesting Officer*     *Acting Commissioner of Patents and Trademarks*